United States Patent

[11] 3,534,765

| [72] | Inventors | T.O. Paine<br>Deputy Administrator of the National<br>Aeronautics and Space Administration with<br>Respect to an Invention of;<br>Harry J. King, Woodland Hills; Seiji Kami,<br>Arleta, California |
|---|---|---|
| [21] | Appl. No. | 745,852 |
| [22] | Filed | July 18, 1968 |
| [45] | Patented | Oct. 20, 1970 |

[54] GAS REGULATOR
5 Claims, 2 Drawing Figs.

| [52] | U.S. Cl. | 137/341 |
|---|---|---|
| [51] | Int. Cl. | F16k 49/00 |
| [50] | Field of Search | 137/341;<br>73/194, 23 |

[56] References Cited
UNITED STATES PATENTS

| 2,009,218 | 7/1935 | Baumhauer et al. | 137/341X |
|---|---|---|---|
| 2,608,996 | 9/1952 | Forman | 137/341X |
| 2,771,903 | 11/1956 | Notar Bartolo et al. | 137/341 |
| 2,909,919 | 10/1959 | Myer | 73/23 |
| 3,100,868 | 8/1963 | McAfee | 73/23X |
| 3,323,362 | 6/1967 | Wells | 73/194 |
| 3,281,324 | 10/1966 | Henins et al. | 137/341X |
| 3,425,274 | 2/1969 | Clement et al. | 73/194 |

FOREIGN PATENTS

| 40,094 | 4/1956 | Germany | 137/341 |
|---|---|---|---|

*Primary Examiner*—Samuel Scott
*Attorneys*—Monte F. Mott, J. H. Warden and G. T. McCoy ABSTRACT: A device and method for controlling the flow of pressurized gas from a container comprising a suitable metal plug disposed in the outlet from the pressurized vessel, and means for controllably heating the plug to increase the amount of gas allowed to diffuse therethrough. In one embodiment of the invention a plenum chamber is connected to the outlet of the heated plug with means to separately and controllably heat the plenum, whereby a pulse of gas can be provided for feeding to a pressurized fluid line, if desired. In another embodiment, the outlet from the plugged pressurized vessel is used to control a positive expulsion liquid reservoir.

Patented Oct. 20, 1970

3,534,765

INVENTORS
HARRY J. KING
SEIJI KAMI
BY
ATTORNEYS

GAS REGULATOR

ORIGIN OF INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

1. Field of the Invention

This invention is in the field of control of gases and more particularly relates to the control of gases from pressurized containers to produce an extremely small outflow of gas at low or medium pressures.

2. Description of the Prior Art

Prior to the herein invention, the control of outlet gas from a pressurized vessel was through the use of valves or other components having moving parts. The closest prior approach to the elimination of moving parts was in the utilization of metal plugs which when heated would expand to close the outlet lines or regulate through the expansion process the amount of gas that could be emitted. However, even these items are subject, due to the continual expansion and contraction, to fatigue, and do not necessary accurately control minute flow rates. The prior valve systems additionally could not adequately and accurately control very minute flow of gases. There are no known prior art devices for successfully producing very small, on the order of $10^{-4}$cc. gas bursts at medium or low pressure. In fact all mechanical valves have leakage rates exceeding that which is desired by the herein invention. Additionally, for space applications, it is important that the operation of any device to control flow rate of gases would consume a small amount of power as well as having the aforementioned advantage of no moving parts.

Thus, an object of this invention is to provide a device for the controlled release of small quantities of gas at low or medium pressures.

Another object of this invention is to provide a device for the release of small quantities of gas continuously or in pulses as desired.

Still another object of this invention is to provide a device for the controlled release of small quantities of gas which device has no moving parts.

A further object of this invention is to provide a device for the controlled release of small quantities of gas wherein the flow rate is continuously adjustable.

Still one further object of this invention is to provide a method for the controlled release of small quantities of gas at low or medium pressure.

SUMMARY OF THE INVENTION

The device of this invention comprises a metal plug disposed in the outlet of a vessel storing gas under high pressure. Means such as a resistive coil surrounds the plug so as to controllably heat it. As will be shown, the rate of gas emitted or diffused through the plug is a function of the temperature of the plug and thus a control is achieved over the amount of gas being expelled from the storage vessel. At ambient conditions there is virtually no leakage of gas through the plug except for the infinitely small amount that might diffuse through the metal. When it is desired to pulse the gas being emitted from the storage vessel, a storage plenum chamber is inserted downstream adjacent to the heated plug. Means is additionally provided to separately heat this storage plenum. The gas thus then leaks slowly into the plenum, which is selectively heated rapidly to expand the gas when a pulse is required.

When it is desired, for example, to control a flexible internal diaphragm in a rigid reservoir for positive expulsion space applications, the device of this invention is utilized to adjust the flow rate of the high pressure gas from its storage reservoir. In this application the line leading from the metal plug area to the positive expulsion device has a vent line intersecting it having a heated plug therein which can vent the gas as desired so as to decrease the pressure on the internal diaphragm, if desired.

It is believed the invention will be better understood from the following detailed description of drawings in which:

FIG. 1 is a schematic representation of the device of this invention as utilized in combination with a line carrying a liquid metal to inject gas bubbles therein; and FIG. 2 is a schematic representation of the device of this invention to be utilized to control a positive expulsion device.

DESCRIPTION OF PREFERRED EMBODIMENTS

Figure 2:
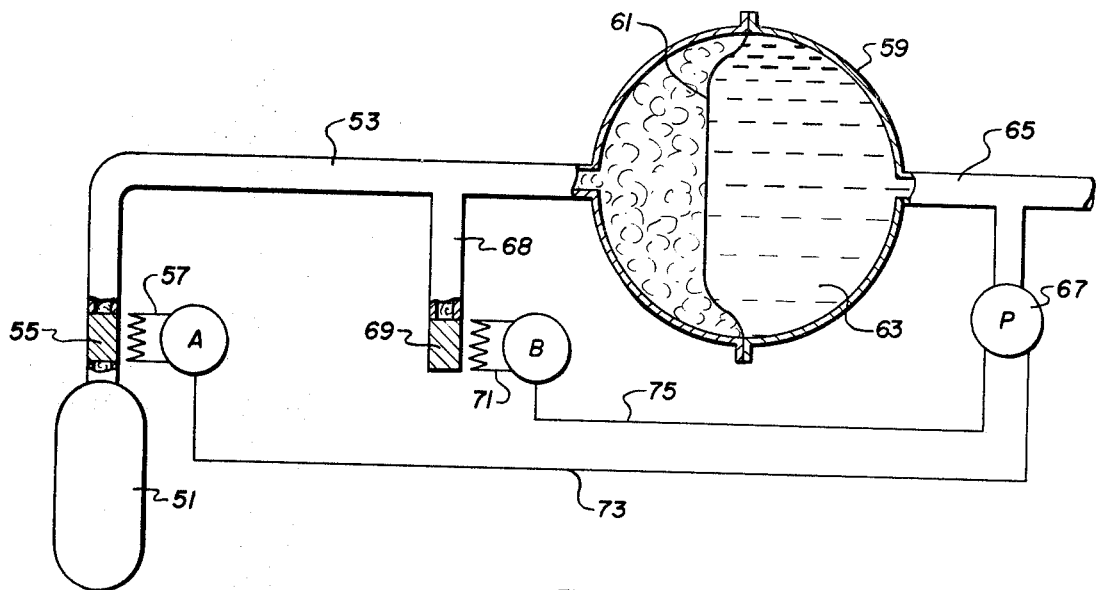

The herein invention was originally conceived to operate in cooperation with solar-electric propulsion systems utilizing electron bombardment thrusters having liquid mercury cathodes, as described by the inventors and others in AIAA Preprint 66-232, 1966. The liquid mercury is supplied to the cathode in these systems under relatively high pressures of 30 to 150 p.s.i. One such system involves several thrusters being supplied by a common reservoir source of the liquid mercury. However, in so doing, a problem results in that liquid mercury is an excellent electrical conductor. Thus a short in one of the thrusters can affect the whole system. In order to overcome this, it was conceived to interject small gas bubbles periodically into the feed line from the liquid metal reservoir to the thrusters. The gas bubbles serve as electrical insulation or electrical isolators. The gas bubbles injected into the liquid mercury line are allowed to escape through a porous section of the feed line just prior to the mercury entering the cathode. As a result, a system is provided wherein an effective electrical isolation of the thrusters is had one from the other. This concept is described in a copending application and does not form the basis of the herein invention. However, as indicated, this invention was originally conceived as a device for feeding gas bubbles in a controlled manner to a liquid mercury line.

In a typical feed line for the liquid mercury, having an inside diameter of 0.040 inch, and a mercury pressure of 30 p.s.i., the requirement was to inject gas bubbles of approximately $2 \times 10^{-3}$cm.[3] volume on demand at approximately 20 minute intervals. No prior devices were known to accomplish this requirement.

The flow of diffusion of gases through metals is a well known principle. The rate of diffusion per unit area of the surface of the metal is in accord with the following formula set forth by Smithells, C.J. and Rousley, C.E., "The Diffusion of Gases Through Metals," Proc. Royal Society A150 1935:

$$I.\,—D = k/d\ (P_1^{1/2} - P_2^{1/2}\ T^{1/2} e - b/T$$

where:

D = rate of diffusion per unit area of surface.
$P_1$ = reservoir pressure.
$P_2$ = downstream presure.
T = temperature of the metal.
d = thickness of the metal.
b = a constant for the gas metal system.
k = a constant.

Prior to this invention, though the foregoing formula and diffusion of gas was known, the metal was not utilized as a means for controllably releasing gases from a stored container as is herein accomplished. As can be seen from the formula, the diffusion is highly temperature dependent. Thus, when the metal plug in the outlet of a gas storage vessel is heated, the diffusion of the gas through the plug is greatly increased.

It should be apparent that the metal utilized in the plug of this invention should be compatible with the gas being stored. For example, nickel, platinum, palladium, copper, iron, aluminum, and molybdenum are materials that could be utilized with hydrogen gas. Molybdenum and iron are selective candidates for utilization with nitrogen, while iron can be used with carbon monoxide and silver with oxygen. The selection of the metal for the plug is obviously within the skill of the art and involves routine experimentation to determine the metal which would give the most satisfactory results.

Figure 1:
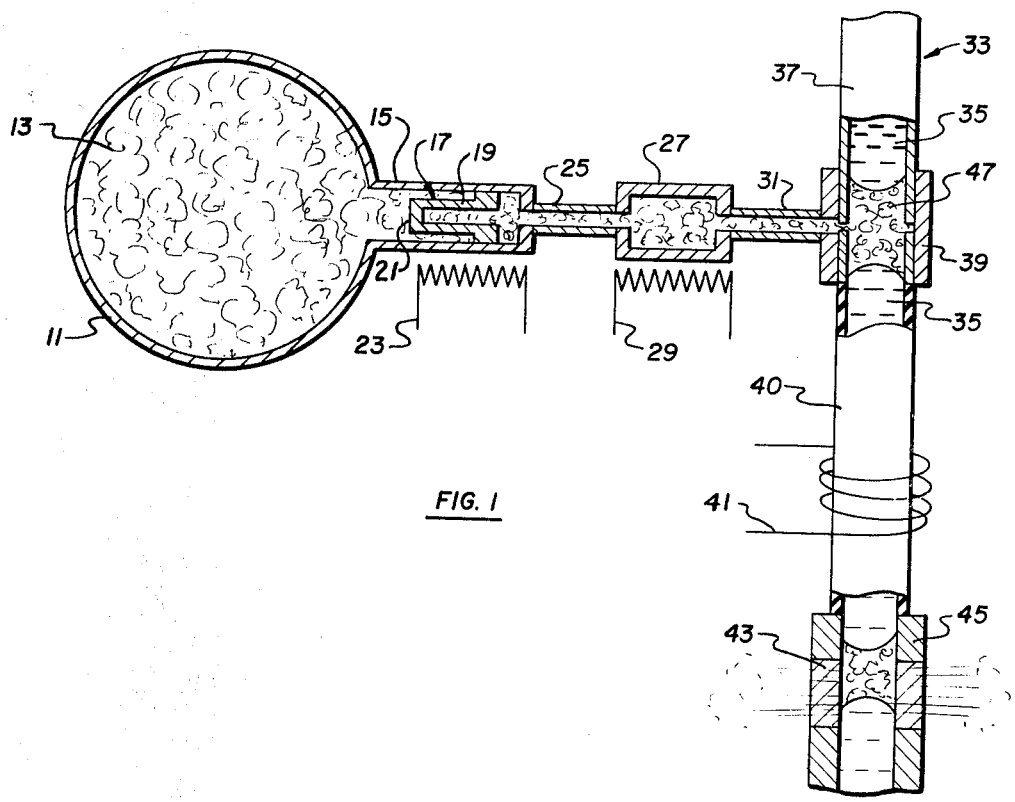

To better understand the invention, attention is directed to FIG. 1. As shown, a vessel 11 contains gas 13 which, for example, could be hydrogen under high pressure of for example 300 p.s.i. In neck 15 of the vessel there is welded a metal plug 17. As can be seen the plug 17 effectively seals the vessel and prevents the escape of gas through the neck 15. The configuration of the plug is subject to variation and but one embodiment is shown in this FIG. The plug is an essentially cylindrical shaped body having slightly thinner wall portions 19 as compared to the base 21, thus enabling most of the gas to diffuse through the greater area provided by the wall portions 19. Additionally, this configuration provides for a larger surface to be effectively heated by a resistive coil 23 surrounding the plug.

Outlet line 25 connects the neck portion 15 to a small plenum chamber 27 just downstream from the plug 17. Resistively heated coils 29 surround this chamber to controllably vary the temperature therein. A thin line 31 connects the plenum chamber 27 to a feedline 33 carrying mercury 35. Line 31 intersects a wall portion 37 of the mercury feedline 33 and is connected by a sleeve 39 thereto. The gas bubble is carried in a portion 40 of the mercury line, which portion is comprised of an insulating material. Material such as Teflon or similar elastomeric insulating material compatible with mercury is suitable for this purpose and serves to prevent the conduction of electricity back to the gas storage vessel and associated equipment line.

Downstream on mercury line 33 is located a coil 41 for inductively sensing the presence of the gas bubbles in the line. The coil can be connected (not shown) to means for controlling the heaters 23 and 29 respectively for the metal plug and plenum chamber to produce the gas bubbles needed. Downstream from the sensing coil at the termination of the insulating line portion 40 is located a porous metal plug 43 through which the gas bubble can leak out from the line into the vacuum of space prior to the mercury entering the thruster. The plug 43 can be connected to the main line 33 by means of a fitting 45.

As indicated, through adjusting the temperature of the plug, the rate at which the gas, such as hydrogen, diffuses through the metal, which may be iron, is controlled. The gas is then collected in the plenum chamber 27. When a gas bubble is required the plenum chamber is heated and the gas expands through line 31 and enters the mercury feedline 33 to form a gas bubble 47 as shown. As can be seen, the herein device works in combination with a constant pressure system. Only the volume of gas in the plenum 27 changes in accord with the temperature as seen from the following well known Perfect Gas Law:

$$\text{II.} \quad \frac{PV}{T} = C$$

Line 31 is sized so that when the plenum chamber 27 is cooled and the gas in the line is contracted, the mercury 35 flowing through line 33 will back up into line 31 to fill the void left by the contracting gas. When the plenum chamber 27 is again heated, the gas expands and pushes the mercury out through line 31 back into the main line 33 together with just enough gas to form bubble 47. The rate of temperature rise of the plenum controls the rate at which the gas expands and thus the rate at which the bubble is formed.

To determine the temperature excursion for the plenum chamber 27 reference is had to Charles Law expressed by the formula:

$$\text{III.} \quad \frac{V_{initial}}{V_{final}} = \frac{T_{initial}}{T_{final}}$$

One first determines how much the volume of gas should be expanded to give a bubble of a given size of volume. Then the foregoing equation is solved for the final temperature of the plenum chamber. For example, if it is necessary to increase the volume of gas by 50 percent and the initial temperature of the plenum chamber was 375°F., then the equation would be as follows:

$$\frac{1}{1.5} = \frac{375° \text{ F.}}{T_{final}}$$

It can be seen from formula I that the rate of diffusion of the gas through the metal plug is also dependent on the pressure in the storage vessel. Thus to accurately maintain a constant diffusion rate through the metal plug, as the pressure of gas in the vessel would decrease, a proportional increase in temperature should be achieved in the metal plug.

A further aspect of the invention to be noted is that the diffusion or leakage of gas through the metal plug is dependent upon the thickness of the plug. If the plug is a thin wafer, there will obviously be leakage of the gas. However, the thin plug will diffuse a given rate of gas at a lower temperature than a thick plug and will not require as much power to heat it so as to increase diffusion when the demand for gas is increased. Alternatively, a very thick plug will prevent almost all leakage but, on the other hand, requires considerably more power because of the higher temperature needed to increase the diffusion as compared to a thin wafer. This, of course, is seen from formula I. Thus, in most applications a tradeoff is achieved between the power requirement and minimum leakage rate.

The aforegoing description of FIG. 1 is with relation to the achievement of a pulsing effect to produce gas bubbles in a mercury line. It is noted that if the plenum chamber 27 was never heated or did not exist, then the gas traveling down line 31 would just enter the mercury line in a series of small bubbles not serving to produce the relatively larger volume bubbles so as to achieve a discontinuity in the mercury line as shown.

It should be apparent that the plenum chamber 27 does not have to be separated from the metal plug, but can be immediately adjacent thereto. A single heater could then be used to heat both the metal plug 17 and the plenum. The temperature excursions would be an average one to achieve the desired end pulsing effect. The gas flow would be representative of the average temperature of the plug and could be accurately calculated from formula I above together with a knowledge of the temperature of the plug as a function of time for a complete thermal cycle. The approximate average temperature of the plug would be the same as in the embodiment shown in FIG. 1. The size of the temperature excursions would likewise be approximately equal to those imposed upon the separate plenum chamber of FIG. 1.

In outer space applications particularly, positive expulsion devices are needed for forcing propellants into the rocket engines under zero-G conditions. Often very low flow rates of the stored propellant or other material are required. This obviously can only be achieved by a slow flow rate of the gas acting on the flexible diaphragm utilized to expel the material. Because of this, it is believed the herein invention provides a significant improvement in achieving a reliable low flow rate regulation. It has the further advantage of being lightweight, having no moving parts, and as well as being able to operate over a wide pressure range.

Turning now to FIG. 2 there is seen a high pressure gas reservoir 51 connected to a gas feed line 53. In line 53 adjacent the gas reservoir 51 there is disposed a metal plug 55 which is heated by heater 57 in accord with the previous description of this invention. Line 53 intersects a large spherical reservoir 59 having a flexible diaphragm 61 therein, against which the gas acts to push a liquid or other space-storable fluid 63 out through exit line 65.

A small vent line 68 intersects feed line 53 and contains additional metal plug 69 at the end thereof. Plug 69 can be heated by heater 71 in a manner described with regard to the operation of this invention. Outlet line 65 through which the fluid 63 flows has a pressure sensor 67. The pressure sensor 67 is connected through a line 73 to a controller A for plug 55 and associated heater 57 and through a line 75 to controller B for vent plug 69 and associated heater 71.

In the operation of the device, controller A is set to adjust the flow rate of the high pressure gas from reservoir 51 to a desired driving pressure on the flexible diaphragm 61. If it is desired to reduce the driving pressure, the temperature of vent valve 69 is increased through controller B while the temperature of the plug 55 is decreased through controller A. This permits the driving gas to leak out of the plug 69 to the vacuum or surrounding atmosphere through plug 69 faster than it is emitted through plug 55. Obviously the net result of this is a pressure decrease on the flexible diaphragm 61. This can be accomplished automatically through the pressure sensor 67. Alternatively, of course, an increase in driving pressure on the flexible diaphragm 61 is achieved by shutting off vent valve 69 through a decrease in temperature thereof, while increasing the temperature only of the plug 55 adjacent the gas reservoir 51.

We claim:

1. A device for controlably emitting gas comprising:
   a vessel for storing gas under high pressure, said vessel having an outlet therefrom;
   a metal plug disposed in and sealing said outlet;
   means for controlably heating said plug to thereby permit gas to flow therethrough;
   a plenum chamber connected to the outlet of said vessel; and
   means for controlably heating said plenum chamber.

2. The device of claim 1 wherein said outlet comprises a gas carrier line intersecting said vessel.

3. The device of claim 1 further comprising:
   a gas carrier line connected at one end to said outlet of said vessel;
   a vent line intersecting said gas carrier line;
   a metal plug disposed in said vent line; and
   means for heating said metal plug.

4. The device of claim 3 further comprising a positive fluid expulsion device connected to the other end of said gas carrier line.

5. A method for controlling the release of gas from a storage vessel, and pulsing said gas into a constant pressure system, comprising:
   disposing a metal plug in the outlet of said vessel;
   controlably heating said plug to effect a change in the rate of diffusion of gas therethrough;
   disposing a plenum chamber adjacent the outlet of said vessel; and
   controllably heating said plenum chamber to produce thrusts of gas when the chamber is so heated.